United States Patent Office 3,736,263
Patented May 29, 1973

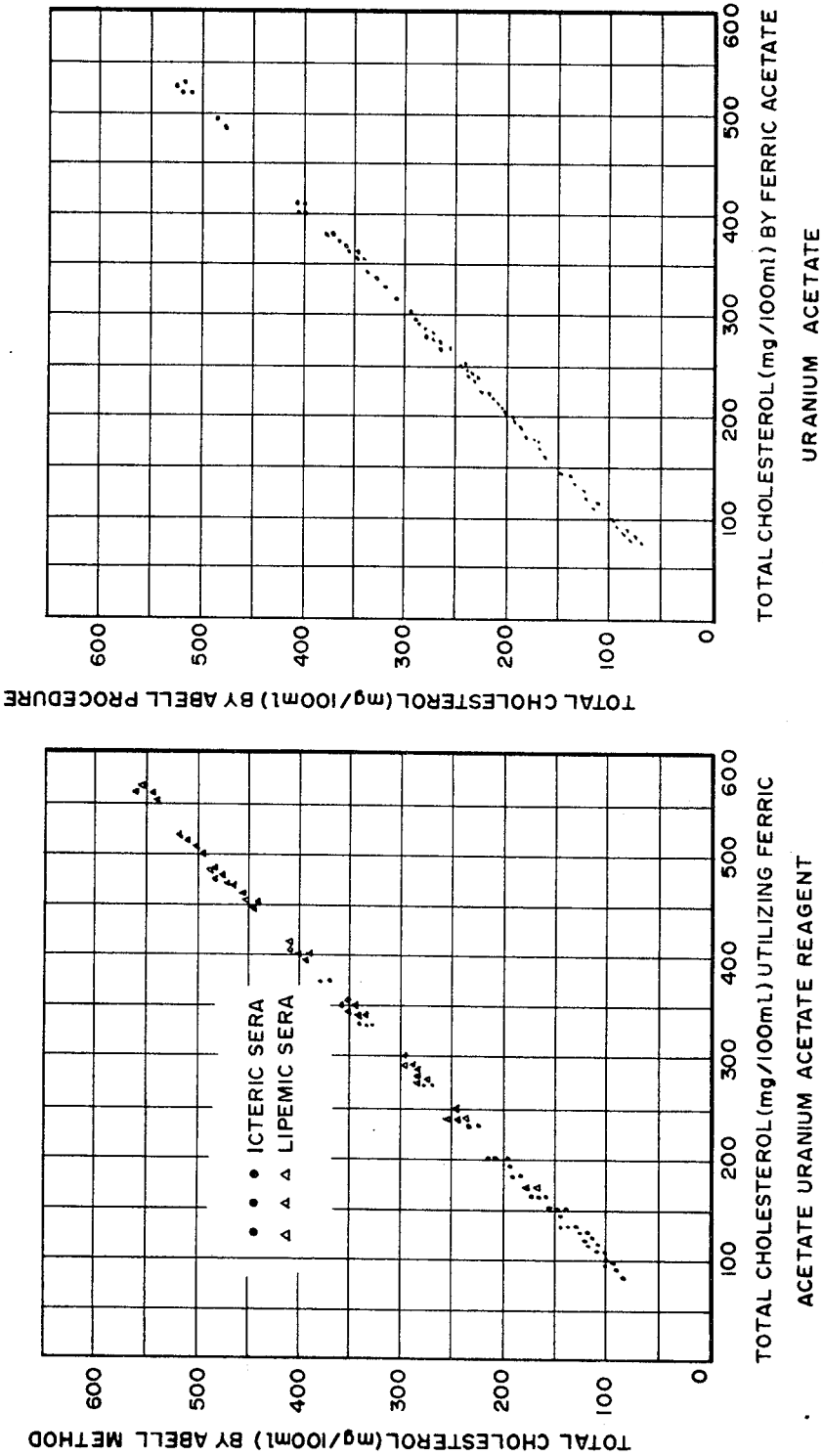

3,736,263
REAGENT FOR DETERMINING CHOLESTEROL
Amritlal C. Parekh and David H. Jung, Indianapolis, Ind., assignors to Research Corporation, New York, N.Y.
Original application Feb. 5, 1970, Ser. No. 8,954. Divided and this application May 13, 1971, Ser. No. 143,264
Int. Cl. G01n 33/16
U.S. Cl. 252—408
1 Claim

ABSTRACT OF THE DISCLOSURE

A reagent for producing a color forming reaction with solubilized cholesterol comprising a mixture of ferrous sulfate and sulfuric acid and, optionally, acetic acid.

---

Figure 2:
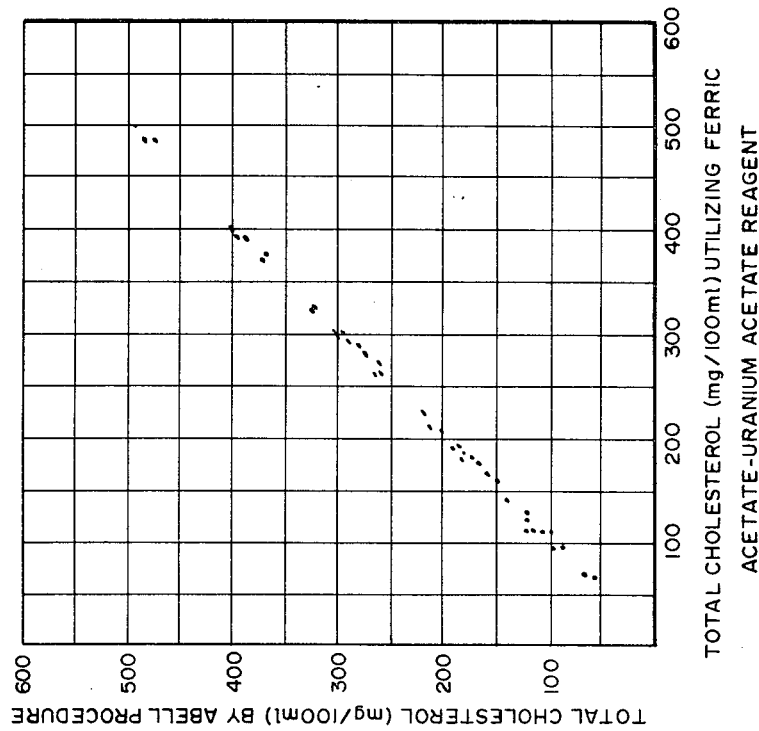

This application is a divisional application of our application Ser. No. 8,954, filed Feb. 5, 1970, now U.S. Pat. No. 3,615,232 issued Oct. 26, 1971.

BACKGROUND OF THE INVENTION

The present invention relates to a reagent and method for quantitatively determining the amount of total cholesterol in body fluids, preferably colorimetrically.

Cholesterol exists in substantially all plant and animal cells either in the free form or as an ester. It often exists in admixture with one or more of its derivatives such as dehydrocholesterol, 7-dehydrocholesterol, etc. Cholesterol is an essential ingredient in human blood and is present in constant amounts therein in normal, healthy human beings. The cholesterol level in human blood is usually measured as "total cholesterol" which includes the sum of the free cholesterol and its derivatives. In human blood, these derivatives predominantly comprise esters thereof with the fatty acids contained in human blood.

Recent medical research has unearthed evidence which directly equates the total cholesterol content of blood with certain maladies. For example, the total cholesterol count has been found to be unusually high in the blood of human beings suffering from diabetes, certain diseases of the liver, familial hypercholesterolemia, alcoholism, syphilis, nephritis and other maladies. Most importantly, a high blood cholesterol content has been found to have a direct bearing on the incidence of atherosclerosis and other vascular difficulties.

There have been recently introduced several methods and reagents for quantitatively determining the cholesterol content of human blood. The most successful of these methods involve the colorimetric determination of cholesterol following the addition to serum samples of a reagent adapted to react with cholesterol and its derivatives and form a color. The intensity of this color may be measured in a suitable apparatus such as a spectrophotometer, etc. The amount of cholesterol may then be calculated by comparing this measured intensity with that of a known standard.

Inasmuch as cholesterol and its derivatives are highly insoluble, it is necessary to add a reagent or solvent to the blood serum to solubilize the cholesterol prior to reaction with the color-developing reagent. In the past it has been suggested to employ various materials to solubilize cholesterol. All of the previously employed solubilizing agents suffer from serious disadvantages, however. Although several of the proposed methods effectively solubilize cholesterol, they also solubilize other materials in the serum which interfere with the colorimetric determination, e.g., proteins, bilirubin, lipids, etc. Inasmuch as these materials are color-developing during the conventionally employed colorimetric determinations they will obviously seriously interfere with the obtention of a true reading of the intensity of color or optical density attributable to cholesterol. Furthermore, since the content of these materials in human blood varies from person to person, it is virtually impossible to apply a correction factor in the colorimetric analysis.

The standard Abell method, while it does not suffer from the above described disadvantage, is extremely complicated and time consuming in order to avoid the solubilization of interfering chromogens.

The prior art is also faced with a serious problem in that to date the reagents employed to develop color by reaction with cholesterol and its derivatives have been found to be unsatisfactory. The most commonly used reagents are the Liebermann-Burchard reagent and a $FeCl_3$-$H_2SO_4$ mixture. The former comprises a mixture of acetic anhydride and sulfuric acid which develops a green color. The colored reaction product is, however, unstable and requires measurement after the lapse of precise time intervals.

The $FeCl_3$-$H_2SO_4$ reagent forms a more stable colored reaction product but suffers from the disadvantage that HCl is evolved during the color forming reaction thereby causing variations in the reaction temperature. The reagent also contributes a yellow color both in the sample under analysis and in the "blank" or standard with which it is colorimetrically compared thereby interfering with measurement of the optical density.

SUMMARY OF THE INVENTION

By the present invention there is provided a method for the quantitative determination of the cholesterol in body fluids which is relatively simple and easy to carry out utilizing only microquantities of the body fluid, yet is extremely accurate and gives results which are highly reproducible.

By the present invention there is also provided a reagent for the colorimetric determination of cholesterol in body fluids which selectively solubilizes cholesterol and does not solubilize those chromogens which interfere with the quantitative determination.

The reagent of the present invention comprises a mixture of ferric acetate and heavy metal acetate, preferably, uranium acetate [$Fe(C_2H_3O_2)_3$ and $UO_2(C_2H_3O_2)_2$]. The reagent is employed in the method of the invention as a lower aliphatic carboxylic acid, preferably, acetic acid solution. This reagent possesses the unique property of being able to solubilize the total cholesterol content of blood serum while simultaneously precipitating those chromogens which interfere with the quantitative determination such as proteins, lipids, bilirubin, etc.

The method according to the present invention comprises intimately admixing the above defined reagent with a sample of body fluid, separating at least a portion of the liquid phase containing the solubilized cholesterol from the precipitated chromogens and quantitatively analyzing the separated liquid phase for its cholesterol content. Since the interfering chromogens have been substantially entirely eliminated from the liquid phase there is virtually no interference with the analysis. The cholesterol is preferably determined colorimetrically.

The reagent employed to develop the color in the separated liquid phase is preferably a mixture comprising sulfuric acid and ferrous sulfate. When added to the above described separated liquid phase, an intense purple color is developed. Moreover, no side products having colors which interfere with the colorimetric analysis are produced.

As will be apparent to those skilled in the art, the above described method is extremely simple and capable of being carried out without the necessity for extensive training of the operator.

DETAILED DESCRIPTION OF THE INVENTION

The method and reagent of the invention are adapted for the solubilization and determination of the total cholesterol in human body fluids, i.e., the sum total of the free cholesterol and cholesterol derivatives such as dehydrocholesterol, 7-dehydrocholesterol, cholesterol esters, etc. It is an advantage of the method and reagent of the invention that the quantitative determination of total cholesterol is not affected to any significant extent by the presence in he body fluid of other steroids, even in amounts exceeding their physiological concentrations.

The invention is applicable for the determination of total cholesterol in any cell-free body fluid. Suitable such fluids include blood serum, blood plasma, cell-free tissue homogenizates, etc.

As described above, the reagent of the present invention comprises a mixture of ferric acetate and uranium acetate [$Fe(C_2H_3O_2)_3$ and $UO_2(C_2H_3O_2)_2$]. The reagent is a mixed salt and is preferably employed in the method of the invention as a lower aliphatic carboxylic acid, preferably acetic acid solution. The reagent is conveniently prepared by dissolving ferric hydroxide in acetic acid and then adding uranium acetate. The ratio of ferric acetate to uranium acetate in the mixed salt may vary from about 4:1 to about 4.5:1 by weight. Generally, the carboxylic acid solution may contain from about 0.01 to about 0.1%, preferably from about 0.05 to about 0.06%, most preferably, about 0.055%, by weight, of the mixed salt.

The ferric acetate-uranium acetate reagent of the invention may be utilized to solubilize cholesterol and precipitate the interfering chromogens in the fluid sample analyzed by any quantitative method which depends upon the determination of solubilized chloesterol. Preferably, the reagent is utilized to solubilize the cholesterol for colorimetric analysis wherein the solubilized cholesterol is reacted with a color forming reagent and the resulting color is measured, i.e., with a spectrophotometer. The reagent is preferably employed in a method, however, which depends upon the reaction of the solubilized cholesterol and a color developing reagent comprising a mixture of sulfuric acid and ferrous sulfate. As noted above, the utilization of an $H_2SO_4$-$FeSO_4$ reagent does not result in the production of undesirable color-forming side products or in variations in the reaction temperature. $FeSO_4$ is difficultly soluble in concentrated $H_2SO_4$ and is therefore preferably first dissolved in glacial acetic acid prior to admixture with the sulfuric acid.

The method of the invention comprises adding a sufficient amount of the ferric acetate-uranium acetate reagent to the blood serum to be analyzed to solubilize the total cholesterol content thereof and precipitate all of the interfering chromogens contained therein, i.e., proteins, lipids, bilirubin.

Generally, an amount of the reagent is added to the body fluid sample, either in solid or solution form, sufficient to provide a sample to reagent ratio, by weight, of from about 1:50 to about 1:300, preferably from about 1:100 to about 1:250, is sufficient to solubilize the cholesterol and precipitate the interfering chromogens. A sample to reagent ratio of about 1:200 is most preferable.

The ferric actate-uranium acetate reagent and body fluid sample are intimately admixed and the mixture allowed to stand for a sufficient period of time to ensure complete solubilization of all of the cholesterol contained in the sample and to ensure complete precipitation of all of the interfering chromogens contained therein. The amount of time required is obviously dependent upon a variety of factors, including the size of the sample, amount of reagent employed, the cholesterol and other chromogen content of the sample, etc. Generally, however, where a sample size of from about 0.001 to about 0.1 ml. is to be analyzed and sufficient reagent is employed to provide a sample to reagent ratio by weight of from about 1:50 to about 1:300, a period of time for precipitation of interfering chromogens and proteins of from about 5 to about 15 minutes, preferably from about 5 to about 7 minutes, is usually sufficient.

Following complete solubilization of the cholesterol and precipitation of the interfering chromogens at least a portion of the liquid phase of the body fluid sample is separated from the precipitate. This is most conveniently accomplished by centrifuging the sample to segregate the liquid phase and the precipitated solids. A portion of the supernatent liquid phase is then drawn off and transferred to a suitable container for colorimetric or other quantitative analysis.

The amount of liquid phase drawn off is not critical and will depend upon the particular method contemplated for analysis. Where color for a colorimetric analysis is developed employing the preferred $FeSO_4$-$H_2SO_4$ reagent of the present invention, a portion of the liquid phase amounting to from about 0.01 to about 5 ml. is generally sufficient for subsequent colorimetric analysis.

As noted above, any conventional colorimetric method may be employed to analyze the body fluid sample. To avoid variations in reaction temperature and the production of side products during the color-forming reaction which interfere with the colorimetric determination, however, it is preferred to employ a colorimetric method which depends upon the color formed by reaction of the solubilized cholesterol with a $FeSO_4$-$H_2SO_4$ reagent. It has been found that the $FeSO_4$-$H_2SO_4$ reagent produces a color, the measurement of which colorimetrically ensures a correct analysis.

The reagent preferably comprises a substantially anhydrous mixture of sulfuric acid and ferrous sulfate. The ratio of ferrous sulfate to sulfuric acid, by weight, may range from about 1:10000 to about 1:30000, preferably from about 1:15000 to about 1:20000. Most preferably a mixture having a ferrous sulfate to sulfuric acid ratio of about 1:18000 is employed. Optionally, the reagent may contain a small amount of acetic acid which is employed to aid in the solubilization of the $FeSO_4$.

In order to develop a sufficiently intense color to enable a precise colorimetric determination of the total cholesterol in the body fluid sample it is generally necessary to add sufficient reagent to the liquid phase containing solubilized cholesterol to provide a reagent:liquid phase ratio, by weight, of from about 1:2 to about 4:1, preferably from about 1:1 to about 3:1. Most preferably, an amount of reagent is employed which provides a reagent:liquid phase ratio of about 1.23:1.

Upon addition of the $FeSO_4$-$H_2SO_4$ reagent to the liquid phase aliquot containing solubilized cholesterol an intense purple color is developed. The sample is allowed to stand for a period of time sufficient to permit maximum color development, generally, from about 5 to about 60 minutes. The sample is then analyzed colorimetrically; most conveniently by measuring the optical density of the sample in a spectrophotometer against a blank containing an amount of ferric acetate-uranium acetate solution equal to the size of the liquid phase portion analyzed and an amount of $FeSO_4$-$H_2SO_4$ reagent identical to that employed to develop the color therein. It is to be understood, however, that any colorimetric method may be employed to analyze the sample.

The invention will be illustrated by the following non-limiting example.

EXAMPLE 1

(a) Preparation of ferric acetate-uranium acetate reagent 0.5 gm. of $FeCl_3 \cdot 6H_2O$ is converted to $Fe(OH)_3$ by admixing concentrated ammonia therewith. The $Fe(OH)_3$ is filtered and washed with water and dried. The $Fe(OH)_3$ is then dissolved in glacial acetic acid and the volume of the solution made up to 1 liter with further glacial acetic acid. 100 mg. of uranium acetate

[UO$_2$(C$_2$H$_3$O$_2$)$_2$·2H$_2$O]

is then dissolved in the solution and the resulting solution allowed to stand overnight.

(b) Preparation of FeSO$_4$-H$_2$SO$_4$ reagent

To 0.1 gm. of anhydrous ferrous sulfate in a flask is added 100 ml. of glacial acetic acid while swirling and then 100 ml. of concentrated sulfuric acid is added. After dissolution of the ferrous sulfate and cooling to room temperature the volume of the solution is made up to 1 liter with concentrated sulfuric acid.

(c) Determination of cholesterol 10 ml. of the ferric acetate-uranium acetate reagent prepared according to the above described process are added to a 16 x 125 mm. tube provided with a screw cap. 50 µl. of a blood serum sample is added to the tube and thoroughly admixed with the reagent. The tube is allowed to stand undisturbed for 5 minutes. A precipitate is observed to have been formed in the mixture. The mixture is centrifuged for 5 minutes.

A 3 ml. aliquot of the supernatant liquid phase is drawn off with a pipette and transferred to another 16 x 125 mm. tube, unscratched, provided with a screw cap, which is adapted for use as a cuvette.

2 ml. of the FeSO$_4$-H$_2$SO$_4$ reagent prepared according to the above described process is added to the aliquot. The tube is tightly capped and the contents thoroughly admixed. The tube is allowed to stand for 20 minutes to permit maximum color development. The purple color of reaction is measured in a spectrophotometer at 560 mµ against a blank consisting of 3 ml. of ferric acetate-uranium acetate solution and 2 ml. of FeSO$_4$-H$_2$SO$_4$ reagent.

EXAMPLE 2

In order to demonstrate the effectiveness of the method and reagent of the present invention for quantitatively determining total cholesterol in human blood serum, the procedure of Example 1 is followed in analyzing 6 different icteric blood sera. The same 6 sera are also analyzed according to the procedure set forth in Example 1 but employing as the solubilizing reagent, ferric acetate, prepared according to Example 1 (a) with the exception that no uranium acetate is added to the solution. The total cholesterol is measured in mg./100 ml. by comparing the measured optical densities with those of standard cholesterol solutions which were analyzed according to the same procedure. The same 6 sera are also analyzed according to the well known Abell procedure which is commonly accepted as the most accurate method, although difficult, tedious and time-consuming, for quantitatively determining cholesterol. The Abell procedure is described in J. Biol. Chem., vol. 195, page 357 (1952) and in Standard Methods in Clinical Chemistry, vol. 2, page 26 (1958).

The results are set forth in Table 1.

ATCC 21397, belonging to Streptomyces phaeoverticul-

TABLE 1

[Mg. cholesterol/100 ml.]

| Serum No. | Abell procedure | Fe(C$_2$H$_3$O$_2$)$_3$·UO$_2$(C$_2$H$_3$O$_2$)$_2$ | Fe(C$_2$H$_3$O$_2$) |
|---|---|---|---|
| 1 | 122 | 122 | 133 |
| 2 | 165 | 166 | 172 |
| 3 | 235 | 233 | 243 |
| 4 | 167 | 168 | 172 |
| 5 | 375 | 375 | 379 |
| 6 | 127 | 129 | 135 |

As is apparent from Table 1, the results obtained according to the method of the present invention compare favorably with the highly accurate results obtained according to the Abell procedure. When employing the ferric acetate reagent, however, which solubilizes both the total cholesterol and interfering chromogens, the results obtained are higher in each instance, thus demonstrating the effectiveness of the reagent of the invention in eliminating the interfering chromogens.

EXAMPLE 3

In order to demonstrate the effectiveness of the FeSO$_4$-H$_2$SO$_4$ color developing reagent, the procedure of Example 1 is followed in analyzing 6 different icteric sera. In one analysis of the 6 sera, the FeSO$_4$-H$_2$SO$_4$ reagent is employed. In the second analysis, H$_2$SO$_4$ alone is employed to develop the reaction color. In both of the foregoing analyses, the ferric-acetate-uranium acetate reagent of the invention is utilized. In the third analysis the Abell procedure is followed. The results are set forth in Table 2.

TABLE 2

[Mg. cholesterol/100 ml.]

| Serum No. | Abell procedure | H$_2$SO$_4$-FeSO$_4$ | Conc. H$_2$SO$_4$ |
|---|---|---|---|
| 1 | 375 | 375 | 4001 |
| 2 | 307 | 305 | 326 |
| 3 | 168 | 170 | 176 |
| 4 | 127 | 128 | 132 |
| 5 | 172 | 173 | 180 |
| 6 | 126 | 129 | 135 |

As is apparent from Table 2, the results obtained when following the method of the invention and employing the FeSO$_4$-H$_2$SO$_4$ color developing reagent compare favorably with those obtained following the Abell procedure. When employing only H$_2$SO$_4$, however, the results obtained are consistently higher.

EXAMPLE 4

The procedure of Example 1 is repeated employing samples from a serum pool containing 82 mg./100 ml. cholesterol to which were added varying amounts of cholesterol. The results are set forth in Table 3.

TABLE 3

| Cholesterol added (mg./100 ml.) | Total cholesterol content (mg./100 ml.) | Cholesterol recovery (mg./100 ml.) | Percent recovered |
|---|---|---|---|
|  | 82 | 82 | 100.0 |
| 80 | 162 | 162 | 100.0 |
| 100 | 182 | 182 | 100.0 |
| 200 | 282 | 281 | 99.5 |
| 300 | 382 | 381 | 99.6 |
| 400 | 482 | 476 | 98.8 |

EXAMPLE 5

The procedure of Example 1 is followed utilizing ferric acetate reagents having different concentrations in acetic acid. A high cholesterol content serum was employed (400 mg./100 ml.). The results are set forth in Table 4. As is apparent, a concentration of ferric acetate of about 5.6 meq./l. is sufficient for cholesterol solubilization and subsequent color development. By employing ferric acetate as the solubilizing component of the reagent rather than the conventionally employed ferric chloride, the objectionable evolution of HCl occasioned by the use of the latter is avoided.

TABLE 4

Ferric acetate reagent
concentration meq./l.          Absorbance

| 1.9 | 0.170 |
| 2.8 | 0.193 |
| 5.6 | 0.197 |
| 11 | 0.197 |
| 22 | 0.197 |
| 33 | 0.197 |

EXAMPLE 6

The procedure of Example 1 is followed with the exception that the amount of $FeSO_4$-$H_2SO_4$ reagent is varied over 6 separate runs. The results are set forth in Table 5.

TABLE 5

| Volume of $H_2SO_4$-$FeSO_4$ ml. | Absorbance |
| --- | --- |
| 0 | 0.145 |
| 1.5 | 0.165 |
| 1.75 | 0.185 |
| 2.0 | 0.195 |
| 2.25 | 0.180 |
| 2.5 | 0.150 |

These results indicate that the optimum ratio of ferric acetate-uranium acetate reagent to ferrous sulfate-sulfuric acid reagent is about 3:2.

EXAMPLE 7

The procedure of Example 1 is followed in analyzing two serum samples. In one analysis the color developing reagent employed is $FeSO_4$-$H_2SO_4$. In the second analysis, an equivalent volume of concentrated $H_2SO_4$ is employed. The optical densities are measured at different time intervals. The results are set forth in Table 6.

TABLE 6

| Time, intervals, mins. | Absorbance, $FeSO_4$-$H_2SO_4$ reagent | Absorbance, $H_2SO_4$ reagent |
| --- | --- | --- |
| 5 | 0.215 | 0.190 |
| 10 | 0.223 | 0.194 |
| 15 | 0.225 | 0.194 |
| 20 | 0.225 | 0.192 |
| 30 | 0.225 | 0.190 |
| 40 | 0.225 | 0.188 |
| 50 | 0.225 | 0.188 |
| 60 | 0.225 | 0.183 |

As is apparent, the color developed employing the $FeSO_4$-$H_2SO_4$ reagent is more intense and is more stable than that produced when employing $H_2SO_4$ alone. When using the latter, the color produced is less intense than when using the former and it fades on standing.

EXAMPLE 8

The procedure of Example 1 is followed in analyzing a standard cholesterol sample (200 mg./100 ml.) and a serum sample. The optical densities are measured at various wavelengths. The optical densities of the blank are measured against water. The results are set forth in Table 7.

TABLE 7

| Wavelength, m$\mu$ | Absorbance, blank | Absorbance, standard | Absorbance serum |
| --- | --- | --- | --- |
| 400 | 0.218 | 0.116 | 0.096 |
| 450 | 0.012 | 0.130 | 0.115 |
| 500 | 0.003 | 0.162 | 0.148 |
| 550 | 0.002 | 0.215 | 0.190 |
| 560 | 0.002 | 0.223 | 0.195 |
| 580 | 0.002 | 0.212 | 0.176 |
| 600 | 0.002 | 0.175 | 0.130 |
| 650 | 0.002 | 0.097 | 0.070 |
| 700 | 0.004 | 0.055 | 0.035 |

As is apparent, the absorbance of the blank is ideally low, demonstrating the lack of contribution of interfering color-producing side reaction products by the method of the invention. Moreover, as is apparent from the table the standard and serum samples evidence identical peaks at about 560 m$\mu$.

EXAMPLE 9

Figure 1:
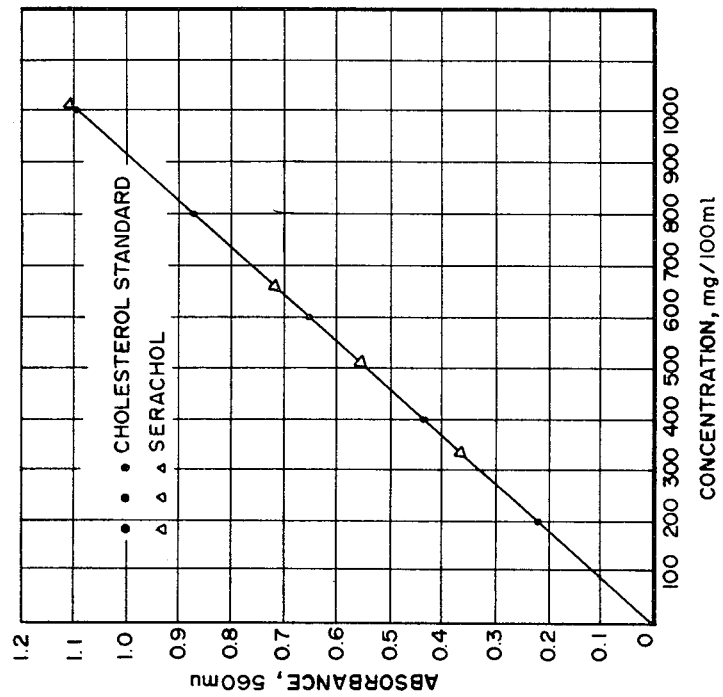

The procedure of Example 1 is followed in setting up a calibration curve. Various cholesterol standards and Serachol solutions (commercial cholesterol standard solutions manufactured by Warner-Chilcott) of various concentrations are analyzed and the absorbancies plotted against the known concentrations. The thus obtained calibration curve is set forth in FIG. 1.

As is apparent, the calibration curve is absolutely linear, even up to 1000 mg./100 ml., thus evidencing the unusually extensive analytical range of the method and reagent of the invention.

EXAMPLE 10

The procedure of Example 1 is followed in analyzing various randomly selected serum samples. The same samples are also analyzed according to the Abell procedure. The results are plotted against each other in terms of mg. cholesterol/100 ml. The resulting scattergram is depicted in FIG. 2.

As is apparent the linearity of the scattergram indicates that the results obtained according to the method of the invention are highly accurate over a wide cholesterol concentration range.

EXAMPLE 11

The procedure of Example 1 is followed in analyzing various samples of both icteric sera and lipemic sera.

The same samples are analyzed according to the Abell procedure. The results (mg. cholesterol/100 ml.) are plotted in the scattergram set forth in FIG. 3.

Again, the results demonstrate the effectiveness of the reagent and method of the invention in eliminating the interference of chromogens such as bilirubin, proteins, lipids, etc. with the quantitative determination of cholesterol by a colorimetric method.

EXAMPLE 12

The procedure of Example 1 is followed in analyzing serum samples which have been preliminarily extracted according to the method of Abell, i.e., 0.5 ml. of Abell's extract is evaporated to dryness, reconstituted with 3 ml. of the ferric acetate-uranium acetate reagent solution and admixed with 2 ml. of the $FeSO_4$-$H_2SO_4$ reagent.

The procedure of Abell is followed in analyzing the same samples. The results are depicted in the scattergram set forth in FIG. 4. As is apparent therefrom, the method and reagent of the invention may be employed equally well in analyzing serum samples by whatever method utilized to extract the cholesterol therefrom.

It is readily apparent from the foregoing examples that the method and reagent of the invention enable precise quantitative determinations of cholesterol with relative ease and simplicity of operation.

We claim:

1. A reagent suitable for producing a color forming reaction with solubilized cholesterol consisting essentially of a solution of ferrous sulfate in sulfuric acid in a weight ratio of from about 1:10,000 to about 1:30,000 and an amount of acetic acid sufficient to effect dissolution of said ferrous sulfate in said sulfuric acid.

References Cited

UNITED STATES PATENTS 3,558,516  1/1961  Wybenga ........ 23—230 B X

OTHER REFERENCES

Mellor, "Comprehensive Treatise on Inorganic and Theoretical Chemistry, vol. 14, pp. 265–368, 271, 272 (1935).

JOSEPH SCOVRONEK, Primary Examiner

U.S. Cl. X.R.

23—230 B, 230 R